United States Patent [19]
Nelson

[11] Patent Number: 5,343,662
[45] Date of Patent: Sep. 6, 1994

[54] AUTO GLASS MOULDING AND DAM

[76] Inventor: Jack R. Nelson, 5920 McKinley Dr., Garden Valley, Calif. 95633

[21] Appl. No.: 968,355

[22] Filed: Oct. 29, 1992

[51] Int. Cl.⁵ .................................. E06B 3/00
[52] U.S. Cl. ........................ 52/208; 52/393; 52/400
[58] Field of Search ............... 52/393, 397, 208, 400

[56] References Cited

U.S. PATENT DOCUMENTS

| | | | |
|---|---|---|---|
| 2,056,024 | 9/1936 | Stuart | 52/400 |
| 3,744,201 | 7/1973 | Dochnahl | 52/400 |
| 4,261,610 | 4/1981 | Inamoto et al. | 52/208 X |
| 4,347,693 | 9/1982 | Kruschwitz | 52/208 |
| 4,438,609 | 3/1984 | Nielson et al. | 52/208 |
| 4,621,469 | 11/1986 | Kruschwitz | 52/208 |
| 4,683,694 | 8/1987 | Ziegler | 52/400 X |
| 4,905,432 | 3/1990 | Romie | 52/208 |
| 4,986,867 | 1/1991 | Braendle et al. | 52/208 X |
| 5,085,021 | 2/1992 | Kunert | 52/208 |
| 5,112,101 | 5/1992 | Katcherian et al. | 52/208 X |
| 5,114,206 | 5/1992 | Yada | 52/208 X |
| 5,150,943 | 9/1992 | Gold | 52/208 X |

Primary Examiner—Rodney M. Lindsey
Assistant Examiner—Suzanne L. Dino
Attorney, Agent, or Firm—Bernhard Kreten

[57] ABSTRACT

An extruded vinyl moulding strip for replacing the window in an automobile is provided. The strip has an "f" shaped cross section having an upper finger and a smaller finger located near the middle of the "f." The lower portion of the "F" has a foam strip adhesively adhered to the moulding strip. The foam strip allows air to contact the interior surface of a urethane bead placed on the lower portion of the "f" in order to allow the urethane to cure properly. The smaller finger operates as a guide to window replacement vis a vis the pinch weld of the window frame.

26 Claims, 3 Drawing Sheets

AUTO GLASS MOULDING AND DAM

FIELD OF INVENTION

1. Background of the Invention

The invention relates to the field of auto glass replacement methods and more specifically, is an extruded vinyl trim moulding designed to hold the urethane sealant and the window glass in place for sealing the window glass within the windshield.

The method described here using the moulding strip is an alternative to the current "butyl tape" or "butyl dam" replacement method. In the former method, a butyl tape kit is applied to the inside edge of the pinch weld and then a continuous bead of urethane is applied behind the the tape kit, the tape holds the windshield in place and prevents sealant from leaking into the interior of the car. This method is not recommended by manufacturers (such as Ford Motor Co.) as air is cutoff from contact from that portion of the urethane sealant facing the interior (facing the interior of the car) resulting in improper curing of the urethane or no curing at all. Improper curing is dangerous and may result in a weak windshield placement. The use of butyl tape also limits the area available for the sealant.

Where the pinchweld is quite narrow sometimes the butyl tape must be dispensed with all together even though this results in lack of support for the windshield as the urethane cures and there is no protection from sealant for the interior of the car.

2. Description of the Prior Art

While there are trim mouldings for fitting between the auto glass and the pinch weld of the frame, none that applicant is aware are of the particular "F" shape cross-section as is the applicant's. Nor are there any mouldings that applicant is aware of that have a foam "dam" to allow for air to reach the urethane on the interior of frame and thereby allow it to cure. Again, the use of an adhesive backing on the foam dam is also believed to be novel.

SUMMARY OF THE INVENTION

The invention is an automobile trim moulding strip for holding a urethane sealant between the auto windshield and the pinch weld located on the edge of the window frame. This is to provide a new and improved method for installing auto windshields. The strip is an extruded vinyl strip with an "F" shaped cross-section having a longitudinal foam piece running along the lower portion of the "F" and having an adhesive backing in contact with the "F." The lower finger of the "F" acts as window height guide for lining up the window in the frame. The foam section allows air to contact the interior of the urethane bead placed on the foam continuously around the windshield.

It is an object of the invention to provide a mechanical bond to the auto body in the form of an F shaped moulding to support the windshield and urethane bead in an auto windshield replacement process.

It is an object of the invention to provide an automobile trim moulding strip that provides air to the underside of the sealant bead for speedy and complete curing of sealant.

Another object of the invention is to provide an automobile trim moulding strip that provides proper alignment of the window vis-a-vis the pinch weld in a windshield replacement process.

Yet another objective is to provide an auto trim moulding strip to provide a quick and easy to set up process for replacing auto windows with urethane sealant.

Another objective is to provide an auto trim moulding strip that provides as large an area as possible for the sealant bead and the window glass.

Another objective is to provide a larger bonding area for glass and auto body contact in a windshield replacement process and a stronger bonding area over conventional butyl tape methods.

Still another objective is to provide a temporary retaining means for an auto windshield in a replacement process until such time as the urethane bead has cured.

Still another objective of the invention is to provide an automobile trim moulding strip for urethane sealing processes that will protect the interior of the automobile from damage from urethane.

Another objective is to provide an automobile trim moulding strip that provides a window seal with aesthetic appearance and prevents sag and movement of the window glass during the bonding process.

Other objectives of the invention will become apparent to those skilled in the art once the the invention has been shown and described.

DESCRIPTION OF THE PREFERRED EMBODIMENT

Figure 1:
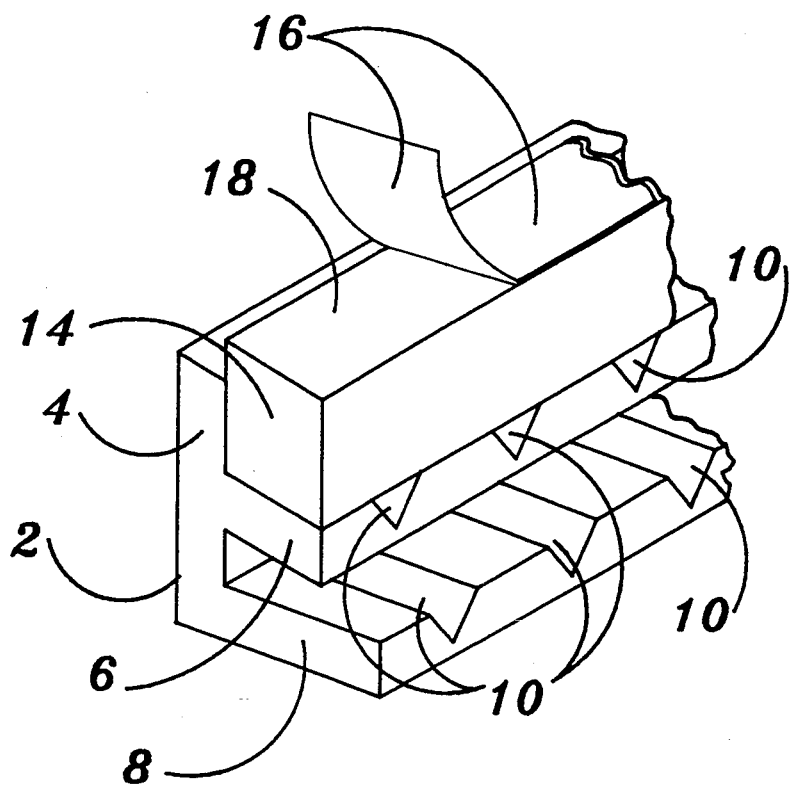
FIG. 1. Overall construction of the moulding strip and foam dam.
Figure 5:
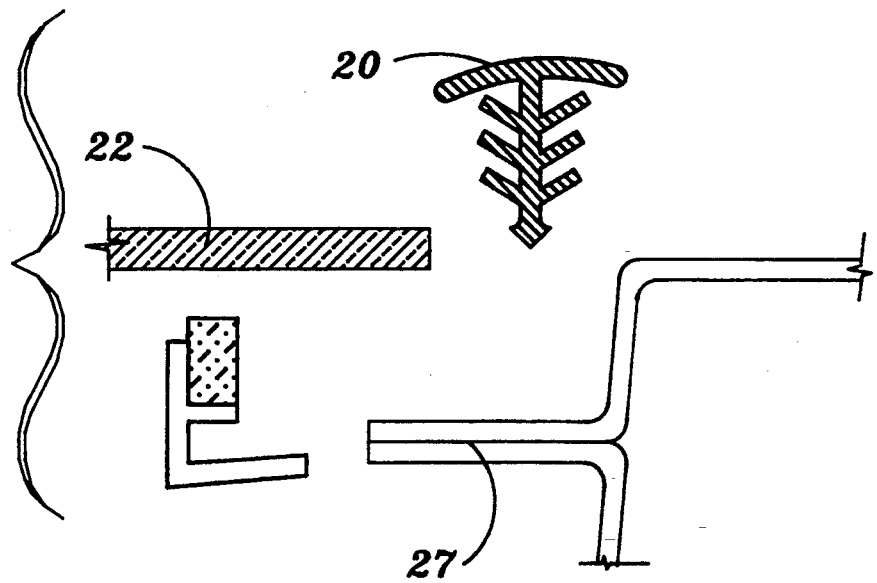
FIG. 5. First step: Initial assembly of autobody and moulding strip.
Figure 6:
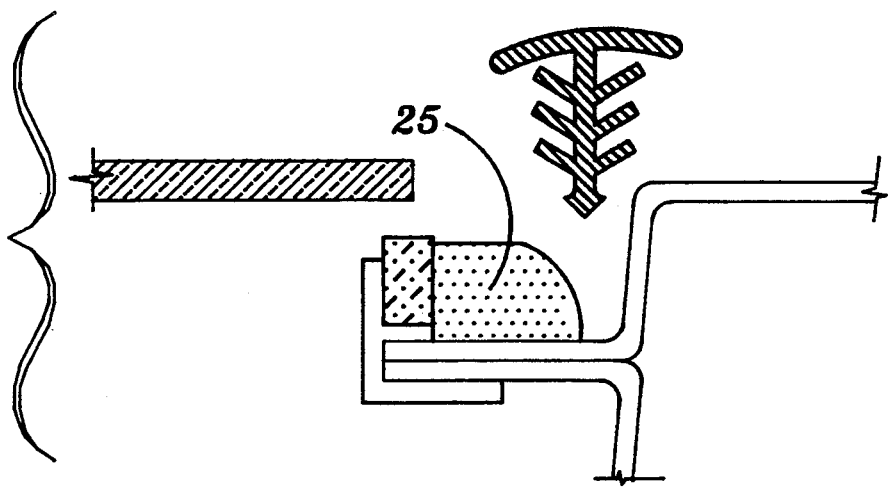
FIG. 6. Second step: Attaching the moulding strip to the autobody.

The F shaped moulding strip 2 is shown in cross-section in FIG. 1. The strip is essentially in an "F" shape with the two fingers of the "F" located at the middle and the top of the "F" respectively. The top finger 8 is placed in contact with the pinch weld 27 of window frame, see FIG. 5 and 6. The smaller finger 6 located near the middle of the "F" and serves as a locating device for the windshield 22 in order to properly align the window vis-a-vis the pinch weld.

The lower finger of the "F" is bent at a slight angle towards the upper finger. This angle should be about 10° which may vary more or less depending on the make of auto. The foam strip or dam 14 is located on the lower portion 4 of the "F" below the smaller finger and is known as the "foam dam." The strip runs continuously along the moulding and has an adhesive backing for removal of the foam dam after the urethane has cured.

The foam dam should be adhered to the moulding strip along at least one of the two edges of the dam that are in contact with the lower portion 4 and the short leg 6. This can be with any suitable adhesive. The dam and moulding strip may be sold as one unit for retail supply. It is preferred that the foam dam be of breathable, open celled, foamed polyurethane. Other breathable materials are also possible.

The foam dam prevents urethane sealant 25 from dripping into the interior of the car as well allowing air to contact the urethane bead from the underside or interior side 28 of the window. The dam also provides support for the window while the urethane bead is curing.

The upper surface 18 of the foam dam should have an adhesive coating and a removable strip 16. The strip may be a silicone treated paper mask. It is removed after the F strip is in place to secure the windshield to the F strip. The adhesive should be strong enough to support 20 lbs. per square inch and holds the windshield in place during curing. This prevents sag and movement of the windshield during the curing process which is a problem with conventional methods. This adhesive side of the foam dam is not to be confused with the two sides of the dam that are in contact with the lower portion of the F strip, one or both of these sides may also have adhesive for attachment to the F strip.

The moulding should be sold as a strip which can then be cut in strips of length appropriate to the windshield being worked on. It may also come in pre-cut lengths which may be chosen based on the auto make and model. When ready to replace the windshield, the moulding is placed against the pinch weld along the window frame with the upper finger of the "F" inside the pinch weld, see FIG. 6. A bead of urethane sealant 25 is then spread along the foam dam, the use of the foam allows the urethane to cure as air will contact the underside of the urethane once the windshield is placed on the moulding.

The windshield (or window) 22 is then laid alongside the smaller finger using the smaller finger as a guide to placing the window vis-a-vis the pinch weld. The replacement window must then be allowed to cure (setting of the urethane bead locking the window into place). Finally, when the window is suitably secured in the window the foam dam may be removed.

Figure 7:
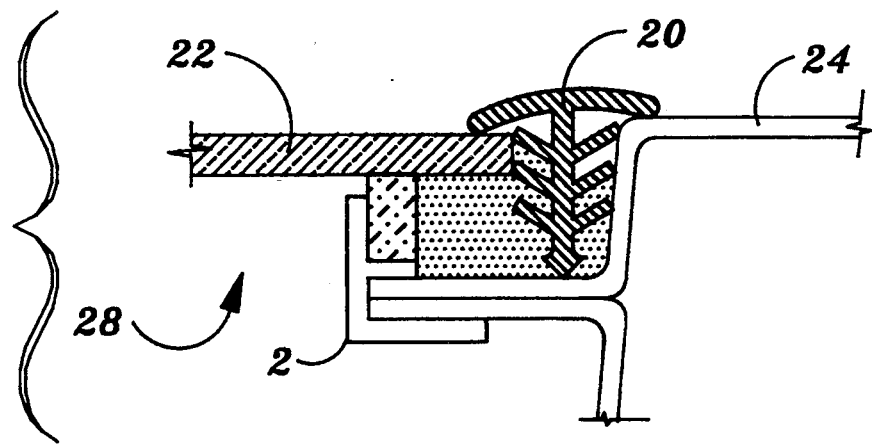
FIG. 7. Third step adhering windshield to strip with urethane adhesive.

Finally the windshield trim moulding 20 is added to the space between the windshield and the auto body 24, see FIG. 7. This trim is not to be confused with the F shaped trim moulding 2.

The resulting finished product has a clean look around the window frame with only a clean moulding strip visible to the occupants on the inside of the vehicle.

Figure 2:
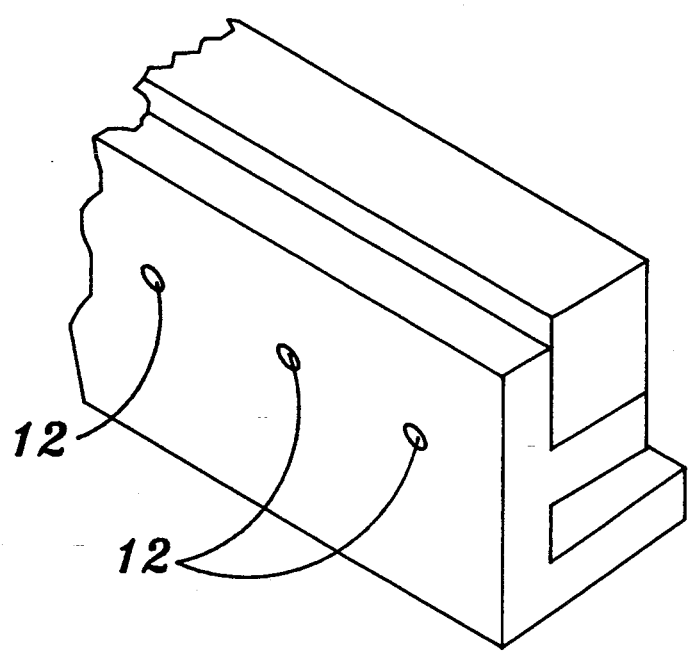
FIG. 2. Rear view of moulding strip showing air holes.
Figure 3:
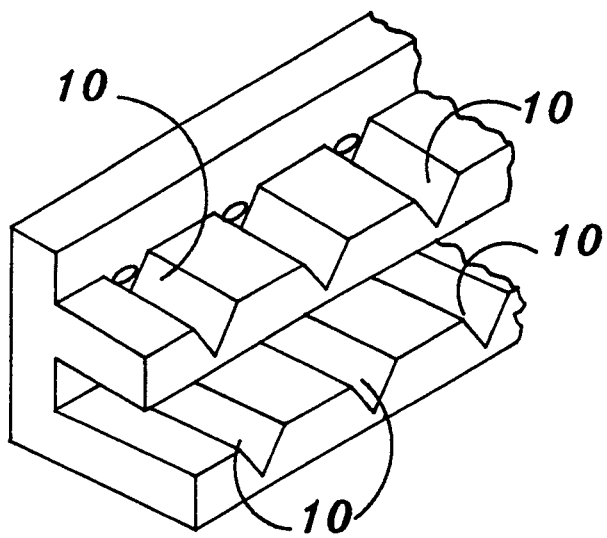
FIG. 3. Moulding strip without dam showing stamped grooves.
Figure 4:
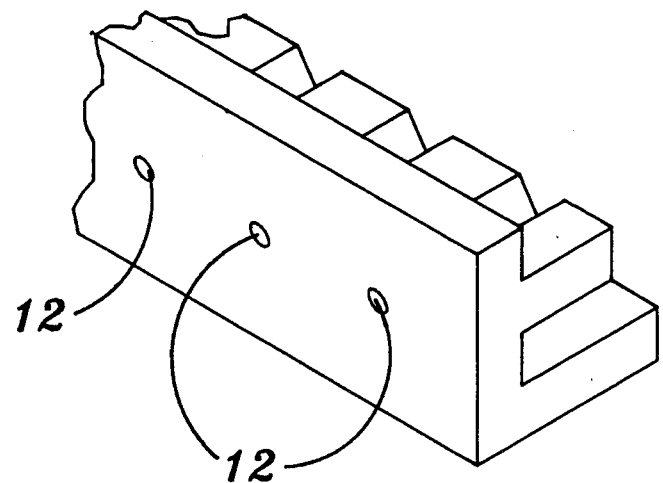
FIG. 4. Rear view with foam dam in place.

Air holes 12 may be added at spaced intervals along the backbone of the F, see FIG. 2. These holes go completely through the strip (they are visible in FIG. 3 as well) and help to supply air to the urethane bead as it is curing. The holes may about 1/64".

Grooved portions 10 may also be placed at spaced intervals in the legs 4 and 6 of the "F." This is to enable the strip to be bent along a curve when as it fits curved portions of the window opening in the auto body. The grooves may also be in connection with the air holes, see FIG. 3 to further speed the curing process. The grooves should be placed at ½" intervals. They should probably be about ¾ of the thickness of the F strip.

I claim:

1. A method for securing automobile glass to a window frame of an automobile, the window frame having a pinch weld, including the steps of:

forming an elongated strip of moulding to have a cross-section with two fingers which are dimensioned to grasp the pinch weld therebetween and a lower portion extending from the fingers such that the cross-section of the moulding is F-shaped and has:

a lower portion of elongate form having a first end and a second end, an upper finger extending substantially perpendicularly from the first end of the lower portion, and a lower finger extending from the lower portion at a point on the lower portion between the first end and the second end of the lower portion;

locating the moulding adjacent the pinch weld with the fingers grasping the pinch weld therebetween and orienting the lower portion toward an exterior of the automobile;

positioning a porous dam adjacent the lower portion and one of the two fingers on an exterior of the pinch weld, the porous dam spaced a distance away from the pinch weld similar to a desired thickness of a urethane sealant;

placing an interior surface of the automobile glass adjacent a side of the porous dam distant from the pinch weld;

directing uncured urethane sealant between the glass and the pinch weld; and curing the urethane sealant, including allowing air to pass through the porous dam and into contact with the urethane sealant.

2. The method of claim 1 including the further step of connecting the glass to a surface of the porous dam opposite the pinch weld before said directing step, whereby said glass is held in place by said curing step.

3. The method of claim 2 wherein said forming step includes forming a first of the two fingers on the exterior of the pinch weld shorter than a second of the two fingers oriented on an interior of the pinch weld, whereby contact area between the two fingers and the pinch weld is maximized while increasing a surface area of an exterior of the pinch weld which is exposed for deposition of the urethane sealant thereon.

4. A method for securing automobile glass to a window frame of an automobile, the window frame having a pinch weld, including the steps of:

forming an elongated strip of moulding to have a cross-section with two fingers which are dimensioned to grasp the pinch weld therebetween and a lower portion extending from the fingers;

locating the moulding adjacent the pinch weld with the fingers grasping the pinch weld therebetween and orienting the lower portion toward an exterior of the automobile;

positioning a porous dam adjacent the lower portion and one of the two fingers on an exterior of the pinch weld, the porous dam spaced a distance away from the pinch weld similar to a desired thickness of a urethane sealant;

placing an interior surface of the automobile glass adjacent a side of the porous dam distant from the pinch weld;

directing uncured urethane sealant between the glass and the pinch weld;

curing the urethane sealant, including allowing air to pass through the porous dam and into contact with the urethane sealant;

connecting the glass to a surface of the porous dam opposite the pinch weld before said directing step, whereby said glass is held in place by said curing step;

wherein said forming step includes forming a first of the two fingers on the exterior of the pinch weld shorter than a second of the two fingers oriented on an interior of the pinch weld, whereby contact area between the two fingers and the pinch weld is maximized while increasing a surface area of an exterior of the pinch weld which is exposed for deposition of the urethane sealant thereon; and forming holes in the lower portion of the moulding, whereby air can pass through the lower portion of the moulding and into contact with the porous dam, and hence into contact with the urethane sealant.

5. The method of claim 4 wherein said forming step includes forming the lower portion to extend substantially perpendicularly away from the two fingers.

6. The method of claim 5 wherein said forming step includes forming the lower portion of the moulding to extend a distance away from the first finger a distance similar to a desired thickness of the urethane sealant.

7. A kit for attaching automobile glass, such as a windshield, to a window frame of an automobile, the kit allowing urethane sealant to thoroughly cure, thereby bonding the glass to a pinch weld of the frame, while preventing urethane sealant from leaking into an interior of the automobile, the kit comprising, in combination:

an elongate strip of moulding having a F-shaped cross-section and having:
  a lower leg of elongate form and having a first end and a second end,
  a first finger extending from a point on said lower leg between said first end and said second opposite end, and
  a second finger extending substantially perpendicularly from said first end of said lower leg,
said first finger spaced from said second finger by a distance similar to a thickness of the pinch weld, such that said fingers can grasp the pinch weld with said first finger on an exterior of the pinch weld;

an elongate porous dam having a thickness similar to a desired thickness of the urethane sealant between the glass and the pinch weld, said dam having a porous structure enabling gas to pass therethrough; and a means for attachment of said dam to said first finger of said strip.

8. The kit of claim 7 wherein said strip includes said lower leg extending away from said fingers and from an interior of the automobile.

9. The kit of claim 8 wherein an attachment means is provided between said dam and said glass attaching said dam to said glass, whereby said glass is fixed with relationship to said dam during curing of the urethane sealant.

10. The kit of claim 9 wherein said lower leg extends to a point substantially adjacent to an interior surface of the glass.

11. The kit of claim 10 wherein said first finger is shorter than said second finger, allowing the urethane sealant to have a maximized surface contact with the pinch weld while still allowing the moulding to securely grasp the pinch weld.

12. The kit of claim 11 wherein said lower leg of said moulding extends substantially perpendicularly away from said second finger and toward the glass.

13. The kit of claim 12 wherein both said attachment means between the glass and said dam and said attachment means between said dam and said first finger include an adhesive.

14. A kit for attaching automobile glass, such as a windshield, to a window frame of an automobile, the kit allowing urethane sealant to thoroughly cure, thereby bonding the glass to a pinch weld of the frame, while preventing urethane sealant from leaking into an interior of the automobile, the kit comprising, in combination:

an elongate strip of moulding having a cross-section including a first finger and a second finger, said first finger spaced from said second finger by a distance similar to a thickness of the pinch weld, such that the fingers can grasp the pinch weld with said first finger on an exterior of the pinch weld;

an elongate porous dam having a thickness similar to a desired thickness of the urethane sealant between the glass and the pinch weld, said dam having a porous structure enabling gas to pass therethrough;

a means for attachment of said dam to said first finger of said strip;

wherein said strip includes a lower portion extending away from said fingers and from an interior of the automobile;

wherein an attachment means is provided between said dam and said glass attaching said dam to said glass, whereby said glass is fixed with relationship to said dam during curing of the urethane sealant;

wherein said lower portion extends to a point substantially adjacent to an interior surface of the glass;

wherein said first finger is shorter than said second finger, allowing the urethane sealant to have a maximized surface contact with the pinch weld while still allowing the moulding to securely grasp the pinch weld;

wherein said lower portion of said moulding extends substantially perpendicularly away from said second finger and toward the glass;

wherein both said attachment means between the glass and said dam and said attachment means between said dam and said first finger include an adhesive; and wherein said lower portion includes holes therein which pass entirely therethrough allowing gas to pass therethrough, whereby the urethane sealant is provided with air for effective curing through said holes of said lower portion and through said porous dam.

15. The kit of claim 14 wherein said first finger is oriented at an angle divergent from a line parallel to said second finger, said first finger diverging from said line to locate an end of said first finger distant from said lower portion to be closer to said second finger than an end of said first finger adjacent to said lower portion.

16. The kit of claim 15 wherein said first finger diverges from said line parallel to said second finger at a constant angle of between five and fifteen degrees.

17. The kit of claim 16 wherein said holes in said lower portion have a diameter not greater than one-sixteenth of one inch, whereby air is supplied to the urethane sealant for effective curing thereof while preserving a surface appearance of the lower portion as being substantially non-porous.

18. An apparatus for fastening a glass panel to an opening defining a window frame in an automobile, the frame having a shape similar to the periphery of the glass, comprising, in combination:
- a border of the frame including a pinch weld projecting inwardly toward a center of the frame,
- an elongate flexible moulding having an F-shaped cross-section and having:
  - a lower leg of elongate form having a first end and a second opposite end,
  - a first finger extending from a point on said lower leg between said first end and said second opposite end, and
  - a second finger extending substantially perpendicularly from said first end of said lower leg,
  - said fingers spaced apart a distance similar to a thickness of said pinch weld and straddling said pinch weld with said first finger outside said frame and said second finger inside said frame,
- a foam dam adjacent to a side of said first finger opposite said pinch weld, said foam dam having a porous structure allowing gas to pass therethrough, said foam dam extending from said first finger to a location chosen for the glass panel, and
- urethane sealant interposed between the glass panel and said pinch weld and adjacent to said foam dam;
- whereby said urethane sealant receives additional air for curing through the porous structure of said foam dam, allowing more effective curing thereof.

19. The apparatus of claim 18 wherein an attachment means is interposed between said foam dam and said first finger and between said foam dam and the glass, whereby said foam dam supports the glass without motion relative to said pinch weld during curing of said urethane sealant.

20. The apparatus of claim 19 wherein said moulding includes said lower leg extending away from an interior of the automobile, said lower leg adjacent to a side of said dam opposite aside adjacent said urethane sealant.

21. The apparatus of claim 20 wherein said dam is formed from polyurethane foam having a porous structure which allows gas to pass therethrough.

22. An apparatus for fastening a glass panel to an opening defining a window frame in an automobile, the frame having a shape similar to the periphery of the glass, comprising, in combination:
- a border of the frame including a pinch weld projecting inwardly toward a center of the frame,
- an elongate flexible moulding having a cross-section including a first finger and a second finger spaced apart a distance similar to a thickness of said pinch weld and straddling said pinch weld with said first finger outside said frame and said second finger inside said frame,
- a foam dam adjacent to a side of said first finger opposite said pinch weld, said foam dam having a porous structure allowing gas to pass therethrough, said foam dam extending from said first finger to a location chosen for the glass panel,
- urethane sealant interposed between the glass panel and said pinch weld and adjacent to said foam dam;
- whereby said urethane sealant receives additional air for curing through the porous structure of said foam dam, allowing more effective curing thereof;
- wherein an attachment means is interposed between said foam dam and said first finger and between said foam dam and the glass, whereby said foam dam supports the glass without motion relative to said pinch weld during curing of said urethane sealant;
- wherein said moulding includes a lower portion extending away from an interior of the automobile, said lower portion adjacent to a side of said dam opposite aside adjacent said urethane sealant;
- wherein said dam is formed from polyurethane foam having a porous structure which allows gas to pass therethrough, and
- wherein said lower portion has holes therein allowing gas to pass through said holes, through said dam, and into contact with said urethane sealant.

23. A method for securing automobile glass to a window frame of an automobile, the window frame having a pinch weld, including the steps of:
- forming an elongated strip of moulding to have a cross-section with two fingers which are dimensioned to grasp the pinch weld therebetween and an F-shaped lower portion extending from the fingers;
- locating the moulding adjacent the pinch weld with the fingers grasping the pinch weld therebetween and orienting the lower portion toward an exterior of the automobile;
- positioning a porous dam adjacent the lower portion and one of the two fingers on an exterior of the pinch weld, the porous dam spaced a distance away from the pinch weld similar to a desired thickness of a urethane sealant;
- placing an interior surface of the automobile glass adjacent a side of the porous dam distant from the pinch weld;
- directing uncured urethane sealant between the glass and the pinch weld;
- curing the urethane sealant, including allowing air to pass through the porous dam and into contact with the urethane sealant; and
- forming holes in the lower portion of the moulding, whereby air can pass through the lower portion of the moulding and into contact with the porous dam, and hence into contact with the urethane sealant.

24. A kit for attaching automobile glass, such as a windshield, to a window frame of an automobile, the kit allowing urethane sealant to thoroughly cure, thereby bonding the glass to a pinch weld of the frame, while preventing urethane sealant from leaking into an interior of the automobile, the kit comprising, in combination:
- an elongate strip of moulding having an F-shaped cross-section including a first finger and a second finger, said first finger spaced from said second finger by a distance similar to a thickness of the pinch weld, such that the fingers can grasp the pinch weld with said first finger on an exterior of the pinch weld in said F-shaped cross-section including a lower portion extending from said fingers;
- an elongate porous dam having a thickness similar to a desired thickness of the urethane sealant between the glass and the pinch weld, said dam having a porous structure enabling gas to pass therethrough;
- a means for attachment of said dam to said first finger of said strip; and
- wherein said elongate strip of moulding includes holes therein which pass entirely therethrough allowing gas to pass therethrough, whereby the urethane sealant is provided with air for effective curing through said holes of said lower portion and through said porous dam.

25. An apparatus for fastening a glass panel to an opening defining a window frame in an automobile, the frame having a shape similar to the periphery of the glass, comprising, in combination:

- a border of the frame including a pinch weld projecting inwardly toward a center of the frame,
- an elongate flexible moulding having an F-shaped cross-section including a first finger and a second finger spaced apart a distance similar to a thickness of said pinch weld and straddling said pinch weld with said first finger outside said frame and said second finger inside said frame, said F-shaped cross-section also including a lower portion extending from said fingers,
- a foam dam adjacent to a side of said first finger opposite said pinch weld, said foam dam having a porous structure allowing gas to pass therethrough,
- said foam dam extending from said first finger to a location chosen for the glass panel, and
- urethane sealant interposed between the glass panel and said pinch weld and adjacent to said foam dam;
- whereby said urethane sealant receives additional air for curing through the porous structure of said foam dam, allowing more effective curing thereof; and
- wherein said lower portion of said F-shaped cross-section of said elongate flexible moulding has holes therein allowing gas to pass through said holes, through said dam, and into contact with said urethane sealant.

26. A moulding for circumscribing a pinch weld which defines a border of an area that receives an automobile windshield thereon, said moulding consisting of:

- an elongate strand of material having a substantially F-shaped cross-section defined by one lower leg of elongate form and having first and second opposite ends,
- a pair of fingers projecting from said elongate form, one said finger located adjacent one said opposite end and another said finger located intermediate said opposite ends,
- said fingers spaced to frictionally engage the pinch weld with a free end of said lower leg of elongate form cantilevered from the pinch weld.

* * * * *